United States Patent [19]

Gaunt

[11] 4,210,998

[45] Jul. 8, 1980

[54] TOUGHENING OF PVC-SEPARATOR-ENVELOPED BATTERY PLATES

[75] Inventor: Conrad L. Gaunt, Anderson, Ind.

[73] Assignee: General Motors Corporation, Detroit, Mich.

[21] Appl. No.: 966,056

[22] Filed: Dec. 4, 1978

[51] Int. Cl.$^2$ ............................................. H01M 2/16
[52] U.S. Cl. ................................. 29/623.4; 29/623.5; 429/139; 427/284
[58] Field of Search ................. 29/623.4, 623.5, 623.1; 429/136, 139; 427/284

[56] References Cited

U.S. PATENT DOCUMENTS 631,796   8/1899   Knepper ............................. 429/136

FOREIGN PATENT DOCUMENTS 751398   6/1933   France ..................................... 429/136
924,568   4/1963   United Kingdom ..................... 427/284

Primary Examiner—Daniel C. Crane
Attorney, Agent, or Firm—Lawrence B. Plant

[57] ABSTRACT

A sheet of sintered PVC battery separator material is folded around a battery plate along the bottom edge thereof and heat sealed to itself along the lateral edges of the plate to form an envelope around the plate. The fold is then contacted with a plasticizer (i.e., n-methyl-2-pyrolidone) to toughen it against damage such as splitting, cracking, chipping, etc. during subsequent in-plant handling of the plates. Dimethyl and/or diethyl phthalate may be added to the n-methyl-2-pyrolidone to provide toughening for periods up to about five days.

3 Claims, No Drawings

TOUGHENING OF PVC-SEPARATOR-ENVELOPED BATTERY PLATES

BACKGROUND OF THE INVENTION

Some lead-acid storage battery manufacturers envelop the negative plates of their batteries in ion permeable, tree suppressing battery separator material made from sintered polyvinyl chloride (i.e., PVC) particles such as made by the process of U.S. Pat. No. 3,551,210, Feb. 3, 1969, Bahler et al. An elongated rectangular sheet of the PVC separator material is folded in the middle along the short dimension of the rectangle. The plate is inserted into the folded separator such that the bottom edge of the plate lies in the fold and the halves of the sheet on either side of the fold lay flat against the faces of the plate and overlie the lateral edges of the plate somewhat. Thereafter, the edges of the PVC separator material overlying the plate are cohesively bonded (i.e., heat sealed) to each other so as to form and open-topped envelope around the plate.

The sintered PVC battery separator material is relatively brittle and readily susceptible to damage (e.g., chipping, cracking, splitting, etc.) resulting from subsequent in-plant handling of the enveloped plates. This is particularly true at the fold. In this regard, the fold along the bottom edge of the plate is subjected to abuse each time the stack of plates is picked up and set down and particularly when it is dropped into the battery case during the "casing out" step.

Accordingly, it is an object of the present invention to toughen the folded edge of the separator envelope and thereby increase its ability to withstand in-plant handling. This and other objects and advantages of the present invention will become more readily apparent from the detailed description thereof which follows.

In accordance with the invention, the folded edge of the separator is contacted with a plasticizer capable of wetting the separator and wicking up the sides thereof a short distance (i.e., about 0.3–0.6 cm) without excessively dissolving the PVC. N-methyl-2-pyrolidone is particularly useful for this application as well as combinations thereof with dimethyl and/or diethyl phthalates and water. The plasticizer preferably contains an inert dye which is used primarily to give visual indication of which separators, and the extent to which the separators, have been treated with the plasticizer.

Virtually any known plasticizer for PVC or combinations thereof can be useful with the present invention if it can be made to wet the separator without excessive dissolution thereof. In this regard, preferred plasticizers will have a sufficiently small molecule as to readily wet and wick into the sintered PVC and, is soluble in water so that its solvent strength can be readily controlled by dilution. In this regard, particular success has been achieved with n-methyl-2-pyrolidone, the properties of which may be used as a reference criteria for the selection of other plasticizers. This material has successfully been used in 85% by volume solution with water. Separators so treated have remained plasticized or toughened for periods of about 24 hours. If longer periods of toughening are required because of anticipated delays before final battery assembly, other plasticizers and particularly dimethyl and/or diethyl phthalate can be added to the n-methyl-2-pyrolidone. Such phthalate additions have provided separators adequately toughened for periods up to about five days.

In practicing the invention, a rectangular piece of PVC separator material is locally heated to soften the folding line and then folded along that line and around the bottom edge of the battery plate. The length of the piece is about twice the height of the plate. The fold is made in the center of the piece and the two half-pieces fold up to sandwich the plate therebetween. Thereafter the side edges of the piece adjacent the lateral edges of the plate are cohesively bonded together as by heat or ultrasonics. Following encapsulation, the fold is dipped (i.e., about one second) into a tray containing cellulose sponge saturated with the plasticizer. An appropriately colored (e.g., blue or red), but inert, dye may be added to the plasticizer (i.e., about 2 grams per five gallons of plasticizer) so as to provide sufficient coloring that ready detection of a plasticized separator is possible.

In one specific example, PVC separators made according to the process of Bahler et al (supra) were folded around the bottom edge of negative, lead-acid storage battery plates as described above. The fold was then pressed into a cellulose sponge saturated with a plasticizing solution comprising 85% by volume n-methyl-2-pyrolidone and 15% by volume water and a small amount of red oil soluble dye. The plasticizer wicked up the sides of the separator on either side of the fold to a height of between about 0.3 and 0.6 centimeters. The thusly treated encapsulated plates were assembled into cell groups and finally complete batteries according to the conventional processes therefor. The n-methyl-2-pyrolidone treatment significantly reduced the scrap rate due to cracking, chipping, splitting, etc. of the fold when assembly was completed within about 24 hours of the toughening step.

In another example using the same separator as used in the first example, the fold was dipped into a sponge saturated with a plasticizer comprising 33% by volume of the n-methyl-2-pyrolidone solution of the first example and 66% by volume diethylphthalate. Encapsulated plates so treated showed significantly reduced scrap rates due to cracking, chipping, splitting, etc. of the fold when battery assembly was completed within about five days of the toughening steps.

While the invention has been disclosed primarily in terms of specific preferred embodiments thereof, it is to be appreciated that many variations thereof are possible. In this regard, for example, other plasticizers potentially useful with this invention can be found in such texts as C. E. Schildknecht, *Vinyl and Related Polymers*, Wiley and Sons, New York, 1952, pp. 425–428; and *Modern Plastics Encyclopedia*, McGraw-Hill, 1978–1979, pp. 694–704. Hence, it is not intended that this invention be limited to the preferred embodiments but rather only to the extent set forth hereafter in the claims which follow.

The embodiments of the invention in which an exclusive property or privilege is claimed are defined as follows:

1. In the process of making PVC-separator-enveloped battery plates, including the principal steps of enfolding the plate along the bottom edge thereof within a sheet of sintered microporous polyvinyl chloride separator material and cohesively bonding the sheet to itself around the lateral edges of the plate, the improvement comprising: wicking a PVC plasticizer into the fold and up the separator portions contiguous said fold to toughen said fold against damage during subsequent in-plant handling of said enveloped plate.

2. In the process of making PVC-separator-enveloped battery plates, including the principal steps of enfolding the plate along the bottom edge thereof within a sheet of sintered microporous polyvinyl chloride separator material and cohesively bonding the sheet to itself around the lateral edges of the plate, the improvement comprising: contacting the fold with a PVC plasticizer comprising n-methyl-2-pyrolidone to toughen said fold against damage during subsequent in-plant handling of said enveloped plate.

3. In the process of making PVC-separator-enveloped battery plates, including the principal steps of enfolding the plate along the bottom edge thereof within a sheet of sintered microporous polyvinyl chloride separator material and cohesively bonding the sheet to itself around the lateral edges of the plate, the improvement comprising: contacting the fold with a PVC plasticizer comprising dimethyl and/or diethyl phthalate dissolved in n-methyl-2-pyrolidone to toughen said fold against damage during subsequent in-plant handling of said enveloped plate.

* * * * *